US011262478B2

(12) United States Patent
Im

(10) Patent No.: US 11,262,478 B2
(45) Date of Patent: Mar. 1, 2022

(54) METHOD AND SERVER FOR PREDICTING WEATHER-RELATED DANGEROUS SITUATION AT SPECIFIC POINT ON PATH OF USER BY REFERENCING SEPARATE OBSERVATION DATA OBSERVED FROM MULTIPLE OBSERVATION POINTS

(71) Applicant: Korea Oceanic and Atmospheric System Technology (KOAST), Seoul (KR)

(72) Inventor: Hyo Hyuc Im, Seoul (KR)

(73) Assignee: Korea Oceanic and Atmospheric System Technology (KOAST), Seoul (KR)

( * ) Notice: Subject to any disclaimer, the term of this patent is extended or adjusted under 35 U.S.C. 154(b) by 132 days.

(21) Appl. No.: 16/620,199

(22) PCT Filed: May 31, 2018

(86) PCT No.: PCT/KR2018/006249
§ 371 (c)(1),
(2) Date: Dec. 6, 2019

(87) PCT Pub. No.: WO2018/225985
PCT Pub. Date: Dec. 13, 2018

(65) Prior Publication Data
US 2020/0200944 A1 Jun. 25, 2020

(30) Foreign Application Priority Data
Jun. 8, 2017 (KR) .................. 10-2017-0071395

(51) Int. Cl.
*G01W 1/10* (2006.01)
*G06F 16/909* (2019.01)
(Continued)

(52) U.S. Cl.
CPC ............ *G01W 1/10* (2013.01); *G01C 21/3691* (2013.01); *G06F 16/909* (2019.01); *G06N 20/00* (2019.01)

(58) Field of Classification Search
None
See application file for complete search history.

(56) References Cited

U.S. PATENT DOCUMENTS

| 7,720,630 B1 | 5/2010 | Miller et al. | |
| 2015/0160031 A1* | 6/2015 | Eland | G01C 21/3461 |
| | | | 701/425 |
| 2016/0232131 A1* | 8/2016 | Liu | G06Q 10/06 |

FOREIGN PATENT DOCUMENTS

| JP | 4633588 B2 | 2/2011 |
| JP | 2011163788 A | 8/2011 |

(Continued)

OTHER PUBLICATIONS

Molina et al. "Generating Descriptions that Summarize Geospatial and Temporal Data," 2009 21st IEEE International Conference on Tools with Artificial Intelligence, 2009, pp. 485-492 (Year: 2009).*

*Primary Examiner* — Roy Y Yi
(74) *Attorney, Agent, or Firm* — Husch Blackwell LLP

(57) ABSTRACT

Disclosed in the present invention is a method for predicting a weather-related dangerous situation at a specific point on the path of a user by referencing separate observation data observed from multiple observation points, comprising the steps of: a weather-related dangerous situation prediction server obtaining observation data from each of the observation points; and (b) the server predicting the weather status of the specific point by analyzing geographical distribution information of the observation data and/or temporal change information of the observation data by referencing a machine learning database.

16 Claims, 5 Drawing Sheets

(51) Int. Cl.
*G06N 20/00* (2019.01)
*G01C 21/36* (2006.01)

(56) References Cited

FOREIGN PATENT DOCUMENTS

| KR | 101097947 B1 | 12/2011 |
|---|---|---|
| KR | 1020150001371 A | 1/2015 |
| KR | 1020150055355 A | 5/2015 |

\* cited by examiner

METHOD AND SERVER FOR PREDICTING WEATHER-RELATED DANGEROUS SITUATION AT SPECIFIC POINT ON PATH OF USER BY REFERENCING SEPARATE OBSERVATION DATA OBSERVED FROM MULTIPLE OBSERVATION POINTS

CROSS REFERENCE TO RELATED APPLICATIONS

This application is a U.S. National Phase Application of International Application No. PCT/KR2018/006249 filed on May 31, 2018, which claims the benefit of priority from Korean Patent Application 10-2017-0071395 filed Jun. 8, 2017. The disclosures of International Application No. PCT/KR2018/006249 and Korean Patent Application 10-2017-0071395 are incorporated herein by reference.

FIELD OF THE DISCLOSURE

The present disclosure relates to a method and a server for predicting a dangerous weather-related situation; and more particularly to, the method for predicting a dangerous weather-related situation at a specific point on a user's travel path by referring to individual pieces of observation data measured from multiple observation points, comprising steps of: a dangerous weather-related situation predicting server obtaining the individual pieces of the observation data measured from the observation points, and preparing and managing the observation data as a map by referring to locations of the observation points and analyzing at least one piece of geographical distribution information of the observation data obtained from the observation points located near the specific point or temporal change information thereof by referring to machine learning database that is created by previous learning reference data measured at the observation points, thereby predicting a weather condition of the specific point at a future time coming after a certain period of time from a current time, and the server using the same.

BACKGROUND OF THE DISCLOSURE

In case of short-term prediction, conventional weather prediction systems may predict weather-related situations within 4 hours from a current time every hour and may forecast weather by respective Korean administrative districts, e.g., eup, myeon, and dong, by dividing territory of South Korea into a total of 3,500 small areas of 5 km×5 km. Users of such weather prediction systems do not know accurately from which time for how many minutes an hourly predicted weather-related situation would last. Besides, because weather is averagely forecasted for each area of tens of square kilometers, the weather of a specified section in a certain zone could be different from the forecasted weather for the certain zone.

Because there are few cases in which every user stays at one place in his or her everyday routine, s/he needs to search weather of each place in advance depending on his or her schedule and travel path. In this case, it is not easy to provide against a weather-related situation in consideration of both each time and each location. In addition, if an unexpected dangerous weather-related situation happens, it is difficult to follow his or her schedule.

SUMMARY OF THE DISCLOSURE

It is an object of the present disclosure to solve all problems explained above.

It is another object of the present disclosure to predict a user's travel path and transmit information on a predicted weather condition of a specific point on the user's travel path to the user.

It is still another object of the present disclosure to suggest means of transportation or rescheduling to the user depending on respective predicted weather conditions by respective sections disposed on the user's travel path.

In order to accomplish objects above, representative structures of the present disclosure are described as follows.

In accordance with one aspect of the present disclosure, there is provided a method for predicting a dangerous weather-related situation at a specific point on a user's travel path by referring to individual pieces of observation data measured from multiple observation points, including steps of: (a) a dangerous weather-related situation predicting server obtaining the individual pieces of the observation data measured from the observation points; and (b) the weather-related situation predicting server (i) preparing and managing the observation data as a map by referring to locations of the observation points and (ii) analyzing at least one piece of geographical distribution information of the observation data obtained from the observation points located near the specific point or temporal change information thereof by referring to machine learning database that is created by learning previous reference data measured at the observation points, thereby predicting a weather condition of the specific point at a future time coming after a certain period of time from a current time.

In accordance with another aspect of the present disclosure, there is provided a server for predicting a dangerous weather-related situation at a specific point on a user's travel path by referring to individual pieces of observation data measured from multiple observation points, including: a communication unit for obtaining the individual pieces of the observation data measured from the observation points; and a processor for (i) preparing and managing the obtained observation data as a map by referring to locations of the observation points and (ii) analyzing at least one piece of geographical distribution information of the observation data obtained from the observation points located near the specific point or temporal change information thereof by referring to machine learning database that is created by learning previous reference data measured at the observation points, thereby predicting a weather condition of the specific point at a future time coming after a certain period of time from a current time.

DETAILED DESCRIPTION OF THE PREFERRED EMBODIMENTS

Figure 1:
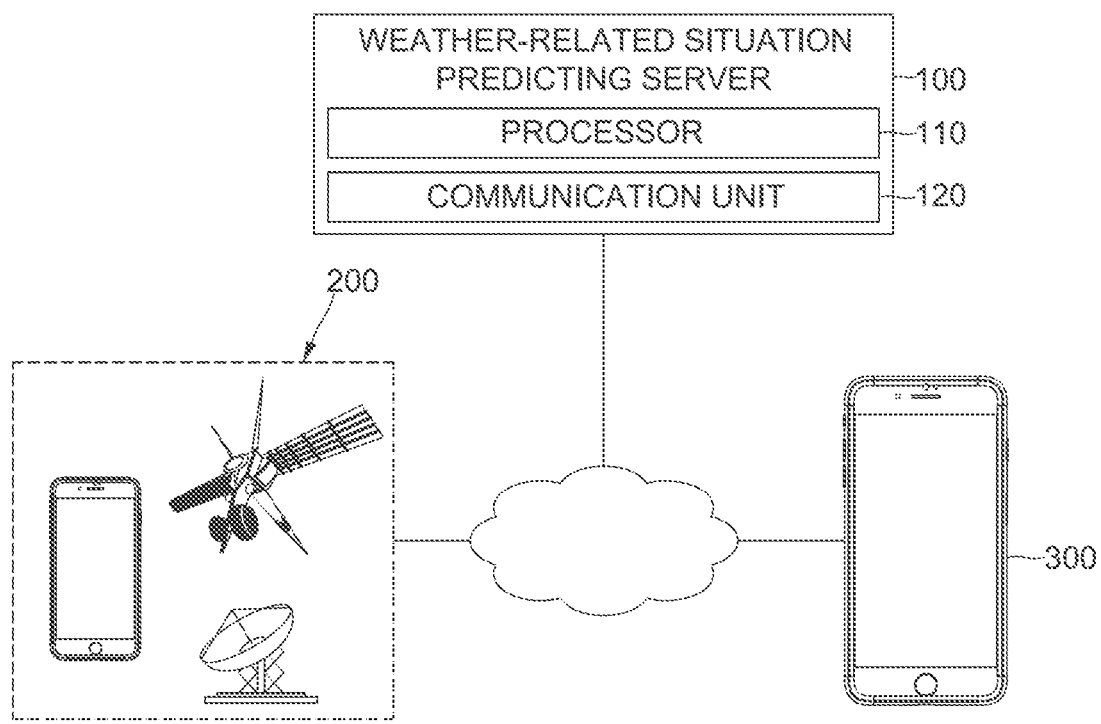
FIG. 1 is a configuration of a whole system including a weather-related situation predicting server in accordance with one example of the present disclosure.

Detailed explanations of the present disclosure explained below refer to attached drawings that illustrate specific embodiment examples of this present that may be executed. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure.

In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To make it easy for those who have common knowledge in the art to which the present disclosure pertains to implement the present disclosure, detailed explanation on desirable embodiment examples of the present disclosure will be made by referring to attached drawings.

FIG. 1 illustrates a configuration of a whole system including a weather-related situation predicting server 100 in accordance with one example of the present disclosure.

By referring to FIG. 1, the whole system in accordance with the present disclosure may include the weather-related situation predicting server 100, observation points 200, a user terminal 300, etc.

The weather-related situation predicting server 100 in accordance with the present disclosure may predict a dangerous weather-related situation at a specific point P located on a user's travel path by referring to individual pieces of observation data measured from multiple observation points 200.

More specifically, the weather-related situation predicting server 100 may include a processor 110, and a communication unit 120. The communication unit 120 plays a role of obtaining individual pieces of the observation data measured from the observation points 200. Herein, the observation data may include measurement data for phenomena such as temperature, wind direction, wind speed, rainfall, precipitation, atmospheric pressure, humidity, thunderstorms, gusts, and earthquakes.

Next, the processor 110 may prepare and manage the observation data as a map by referring to information on locations of the observation points 200. Herein, the map may mean a set of data which have relationships between (i) time information of the observation data obtained from the weather observation apparatuses, i.e., the observation points 200, placed having the relative positioning with each other with a specified spacing, i.e., information on time when the weather observation apparatuses acquire the observation data, and (ii) location information, i.e., information on absolute or relative locations where the weather observation apparatuses obtain the observation data.

In addition, the processor 110 performs a process of predicting a weather condition of the specific point P at a future time coming after a certain period of time from a current time by analyzing at least one piece of geographical distribution information of the observation data obtained from the observation points 200 located near the specific point P or temporal change information thereof by referring to machine learning database.

Figure 2:
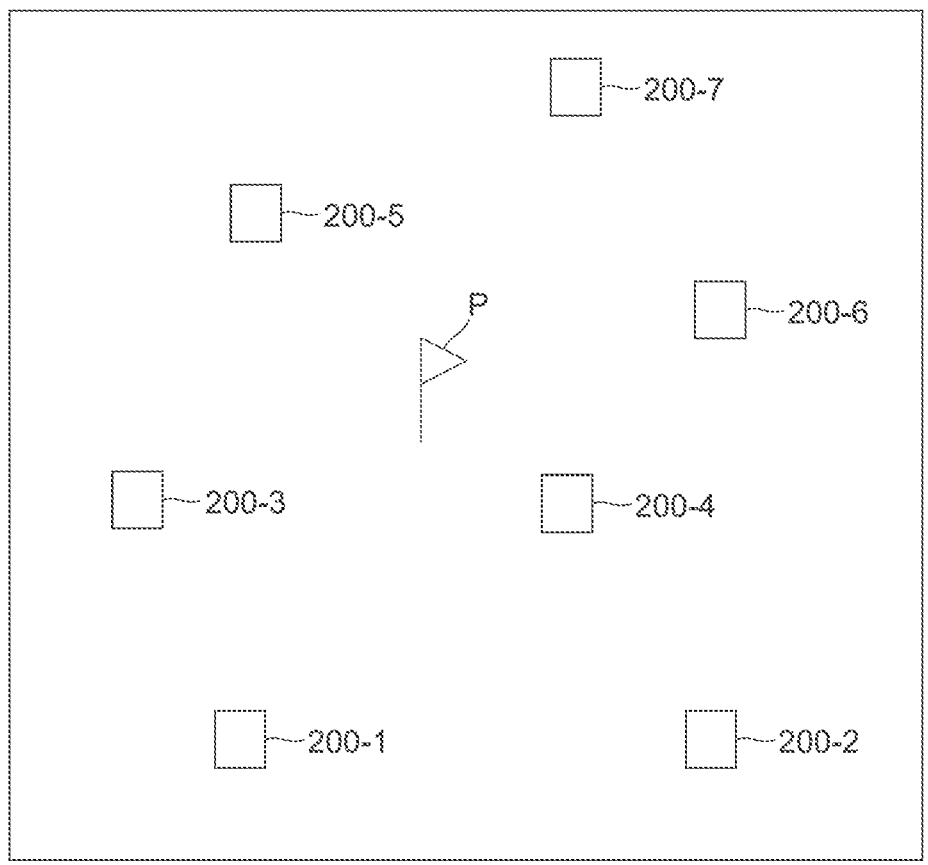
FIG. 2 is an exemplary diagram to explain a method for predicting a weather condition of a specific point by referring to observation data measured from multiple observation points in accordance with one example of the present disclosure.

Herein, by referring to FIG. 2, upon predicting the weather condition of the specific point P by analyzing the geographical distribution information of the observation data obtained from the observation points 200 located near the specific point P, the weather condition of the specific point P may be predicted by analyzing observation data of an observation point 200-4 placed nearest to the specific point P by referring to the machine learning database or by analyzing the individual pieces of the observation data corresponding to geographical distribution of the observation points, e.g., the observation points 200-1 to 200-7, placed within a certain radius of the specific point P by referring to the machine learning database.

Furthermore, upon predicting the weather condition of the specific point P by analyzing the temporal change information of the observation data obtained from the observation points 200 located near the specific point P, for example, if a changing pattern of the observation data at the observation point 200-4 managed in the map from a time 10 minutes ago to a current time is similar to that of previous specific weather condition stored in the machine learning database or that acquired by performing a learning process, it may be predicted that a particular weather condition corresponding to the changing pattern may be possible to occur in the specific point P.

Besides, the weather condition of the specific point P corresponding to a future time coming after a certain period of time from the current time may be predicted by analyzing temporal change information of the observation data corresponding to geographical distribution of the observation points, e.g., the observation points 200-1 to 200-7, located within a certain radius of the specific point P by referring to the machine learning database.

Meanwhile, the machine learning database may be created by learning previous reference data measured at the observation points 200 and also may be created by learning geographical distribution information and temporal change information corresponding to the observation data together. Herein, upon learning the geographical distribution information and the temporal change information, large-scale fluid motion, water, dust, light, electricity phenomena, etc. may be predicted by combining various pieces of weather observation information. In addition, a dangerous weather-related situation that was difficult to analyze in the past can be automatically analyzed by learning a numerical model of the machine learning, i.e., by reducing a loss calculated from expected values and actually measured values. Accordingly, real-time short-term prediction information may be provided by using the learned numerical model.

Next, the processor 110 may predict a location of the specific point P on the user's travel path over time by referring to the user's schedule data and transmit the information on the predicted weather condition of the specific point P before the certain period of time from the future time corresponding to the specific point P through the communication unit 120.

Herein, the schedule data may refer to at least one piece of the user's current location information, moving speed, schedule information stored in a calendar, communication logs acquired from communication history, such as message texts, communication history, social media content, history of search for means of transportation, reservation logs, etc., activity information acquired from a previous activity pattern by day of week or by location such as a commuting pattern, means of transportation, duration of time, and a travel pattern in a selective village.

Figure 3:
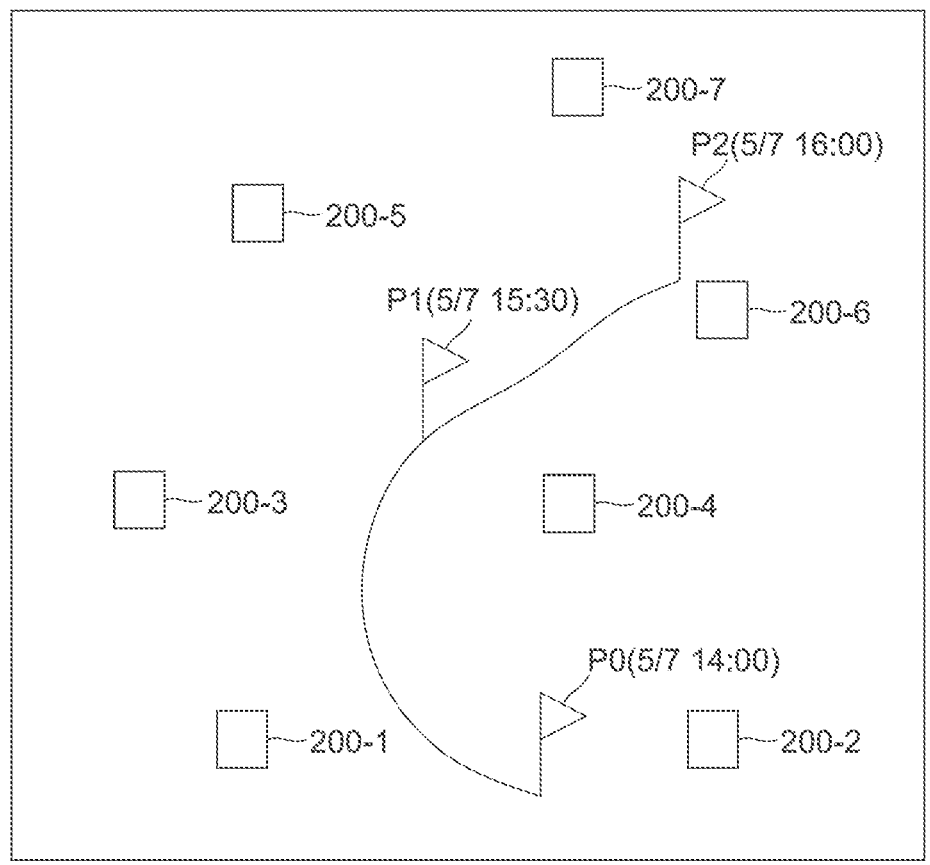
FIG. 3 is an exemplary diagram to explain a method for predicting the weather condition of the specific point on a predicted travel path in accordance with one example of the present disclosure.

More specifically, by referring to FIG. 3, it is possible to predict each of locations of each of the specific points including P0 (May 7 at 14:00), P1 (May 7 at 15:30), and P2 (May 7 at 16:00) on the travel path over time by referring to the user's schedule data.

For example, the processor 110 may transmit a weather condition at 14:00 of the specific point P0 predicted while putting weight on observation points 200-2, 200-1, and 200-4 close to the specific point P0 to the user at 13:30 (before a certain period of time, e.g., 30 minutes, from 14:00 when the user is scheduled to arrive at the specific point P0). Similarly, the processor 110 may transmit a weather condition at 15:30 of the specific point P1 predicted while putting weight on observation points 200-4, 200-5, and 200-3 close to the specific point P1 to the user at 15:30 (before a certain period of time, e.g., 30 minutes, from 15:00 when the user is scheduled to arrive at the specific point P1).

Herein, the predicted weather conditions of the specific points P0, P1, and P2 may be transmitted to the user 30 minutes before the user arrives at the respective specific points and the predicted weather conditions of the three specific points may be also transmitted at 13:30 30 minutes before the user's schedule starts or at a time when the user starts his or her day, e.g., at 07:00.

Besides, if an unexpected weather situation is expected, it would be possible to inform the user of what is required to handle such situation or inform the user of the risk of accessing the place.

For example, if it is expected that a user would do his or her business at a specific point A (not illustrated) in the morning and then go on a business trip to a specific point B (not illustrated) in the afternoon and that it would be sunny in the morning at the specific point A but it would be hit by showers with high dust concentration in the afternoon the specific point B, it would be possible to suggest the user to take a dust mask and an umbrella before the user goes to work.

Besides, if a user plays golf at a golf course, and lightning bolts occur near the golf course, a moving path and a moving speed of the lightning bolts may be predicted by referring to the machine learning database. Then, if the lightning bolts are determined to have a possibility of giving harm to the user, it is possible to recommend that the user should evacuate the place avoiding the moving path of the lightning bolts within a certain period of time.

Meanwhile, the specific point P may include information on a section on the travel path. And the machine learning database corresponding to the previous reference data acquired from the observation points may further include travel data learned from multiple subjects. Herein, the travel data may also include means of transportation used by the respective subjects by individual sections and travel time.

Herein, the processor 110 may suggest (i) the means of transportation by the section of the travel path or (ii) the rescheduling of the travel path, depending on the predicted weather condition, by referring to the machine learning database and the user's predicted travel path through the communication unit 120.

More specifically, by referring to FIG. 3, on assumption that a first section is from P0 to P1 and a second section is from P1 to P2, the means of transportation of the first section or the rescheduling of the first section may be suggested depending on a predicted weather condition of the first section at a time between 14:00 and 15:30 and also the means of transportation of the second section or the rescheduling of the second section may be suggested depending on a predicted weather condition of the second section at a time between 15:30 and 16:00, by referring to previous means of transportation and their corresponding previous time by each of the sections according to respective previous weather conditions.

Exemplarily, on assumption that the first section and the second section are on the user's commuting path, if it is analyzed that the user has an activity pattern of usually taking a bus in the first section and walking in the second section, and a snowstorm as a weather condition is forecasted in the first section and the second section continuously from 12:00, the user might try to use a subway instead of taking a bus in the first section worrying about traffic congestion, but if the subjects used subways more than buses in the past under the similar weather condition and subjects who used buses spent less travel time than those using subways by analyzing current snowfall data and predicted snowfall data using the machine learning database, the processor 110 may suggest that the user use a bus as usual. In addition, if it is expected that it takes more travel time than usual regardless of means of transportation, the processor 110 may suggest that the user change his or her schedule, e.g., leave home earlier.

By the way, the observation points 200 may include moving-type observation points 200 as user terminals 300, where one or more sensors and applications are installed, and installation-type observation points 200 installable on geographic features. More specifically, a user terminal 300 itself such as a smartphone may function as one of the observation points 200 and become an observation point that provides observation data to be used for configuring the machine learning database or provides current observation data.

Explanation on a method for predicting a weather condition in accordance with one example embodiment of the present disclosure by referring to the observation data from observation points in a (1–k)-th zone where the specific point is located will be given below by referring to FIG. 4.

More specifically, multiple observation points 200 may be managed by referring to information on (1–k–1)-st to (1–k–nk)-th observation points 200 placed in a (1–k)-th zone whose boundary is divided into by characteristics of factors affecting a first weather phenomenon where k is an integer that is one of numbers from 1 to m and the processor 110 may predict a weather condition of the specific point P at a future time coming after a certain period of time from a current time by analyzing at least one piece of geographical distribution information of the observation data obtained from the observation points 200 belonging to a specific zone where the specific point is located and temporal change information thereof, through the communication unit 120, by referring to the machine learning database.

Herein, upon comparting a boundary of each zone, a prefixed area may be separated with virtual grid (not illustrated) comprised of cells of fixed size. And specified cells, among the cells, whose degrees of affecting the first weather phenomenon exceed a preset threshold, may be set as one clustered zone. For example, when the first weather phenomenon represents a change in atmospheric pressure, prefixed areas that have close relationships in geographical distribution or geographical characteristics of measured values of temperature, humidity, atmospheric pressure, etc. affecting atmospheric flow may be set as one clustered zone.

Herein, the first weather phenomenon may be water-type phenomenon such as rain, snow, hail, fog, frost, etc. which falls down or floats at a liquid or solid state in the air, dust-type phenomenon such as innumerable fine solid particles containing less moist, e.g., dust, smoke, etc., which float or are blown off by the wind, lighting-type phenomenon as optical phenomenon caused by reflection, refraction, diffraction, or interference of light of the sun or the moon such as rainbow, halo, mirage, morning glow, evening glow, etc., electricity-type phenomenon in the air such as lightning bolt, Saint Elmo's Fire, aurora, etc., general-type phenomenon representing air movement, and disaster-type phenomenon such as earthquake, volcano, explosion of sunspots, etc. but it would not be limited to these.

Figure 4:
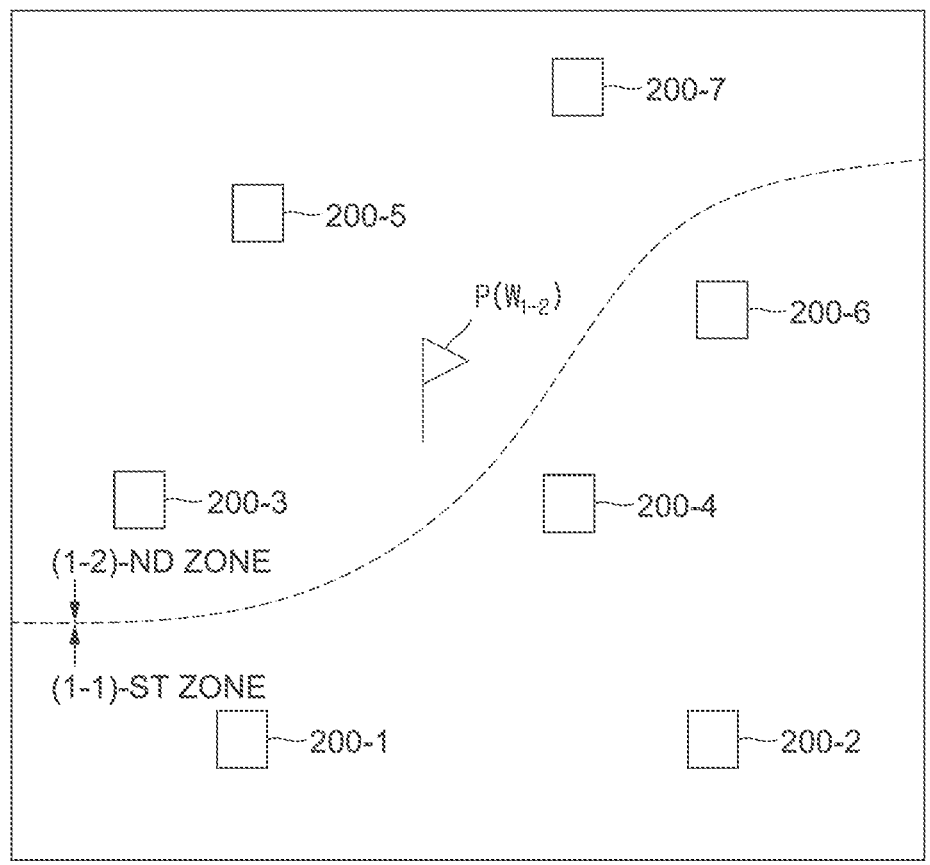
FIG. 4 is an exemplary diagram to explain a method for predicting a weather condition by referring to observation data obtained from observation points in a (1–k)-th zone where the specific point is located in accordance with one example of the present disclosure.

For example, by referring to FIG. 4, among multiple observation points, observation points 200-1, 200-2, 200-4, and 200-6 in a (1–1)-st zone whose boundary is divided into by characteristics of factors affecting the first weather phenomenon may have information on properties related to the (1–1)-st zone and observation points 200-3, 200-5, and 200-7 in a (1–2)-nd zone may have information on properties related to the (1–2)-nd zone.

Herein, upon predicting a weather condition of the specific point P corresponding to a future time coming after a certain period of time, a weather condition $W_{1-2}$ of the specific point P corresponding to the future time coming after the certain period of time may be predicted by analyzing at least one piece of geographical distribution information and temporal change information of observation data obtained from (i) an observation point 200-5 closest to the specific point P among observation points in the (1–2)-nd zone instead of an observation point 200-4 closest to the specific point P or (ii) observation points 200-3, 200-5, and 200-7 in the (1–2)-nd zone, by referring to the machine learning database.

Meanwhile, the multiple observation points 200 may be overlappingly managed by referring to information on (2–k–1)-st to (2–k–nk)-th observation points located in the (2–k)-th zone whose boundary is divided into by characteristics of factors affecting a second weather phenomenon where k is an integer that is one of numbers from 1 to m.

Figure 5:
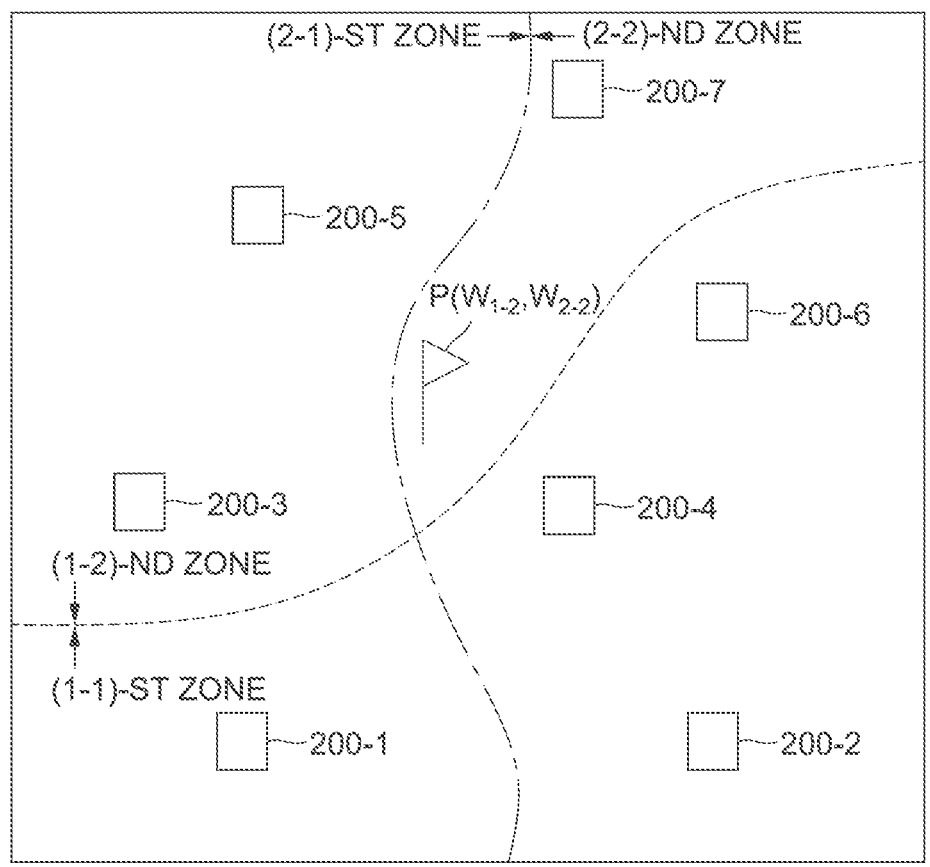
FIG. 5 is an exemplary diagram to explain a method for predicting a weather condition if a boundary of the (1−k)-th zone where a specific point is located is not identical to a boundary of a (2−k)-th zone where the specific point is located in accordance with one example of the present disclosure.

For example, by referring to FIG. 5, observation points 200-1, 200-3, and 200-5 in a (2–1)-st zone whose boundary is divided into by characteristics of factors affecting a second weather phenomenon may have information on properties related to the (2–1)-st zone and at the same time information on properties related to a (1–k)-th zone, and observation points 200-2, 200-4, 200-6, and 200-7 in a (2–2)-nd zone may have information on properties related to the (2–2)-nd zone and at the same time information on properties related to the (1–k)-th zone.

Herein, upon predicting a weather condition of the specific point P, if a boundary of the (1–k)-th zone where the specific point P is located is not identical to a boundary of a (2–k)-th zone where the specific point P is located, the processor 110 may predict a weather condition of the specific point P by using information on the compartment depending on a special weather phenomenon. Herein, the special weather phenomenon may be selected from the first weather phenomenon or the second weather phenomenon that gives greater impact over at least one piece of the geographical distribution information of the observation data and the temporal change information thereof from a particular previous time to the current time.

For example, on assumption that the first weather phenomenon is related to a change in atmospheric pressure and the second weather phenomenon is related to earthquake, if a weather phenomenon that gives greater impact over at least one piece of the geographical distribution information of the observation data and the temporal change information thereof from a particular previous time to the current time is determined as a change in atmospheric pressure, a weather condition $W_{1-2}$ corresponding to a future time coming after a certain period of time may be predicted by considering the (1–1)-st zone and the (1–2)-nd zone serving as compartments on the basis of the first weather phenomenon and analyzing observation data in the (1–2)-nd zone where the specific point P is placed by referring to the machine learning database.

As another example, if a boundary of the (1–k)-th zone where the specific point P is located is not identical to a boundary of the (2–k)-th zone where the specific point P is located, it may be introduced that the first weather phenomenon and the second weather phenomenon may affect each other.

Herein, weighted values of the first weather phenomenon and the second weather phenomenon may be determined by referring to impact over at least one piece of the geographical distribution information of the observation data and the temporal change information thereof from a particular previous time to the current time and the weather condition of the specific point P may be predicted by applying interpolation with the weighted values of the first weather phenomenon and the second weather phenomenon to predicted values of the weather condition of the (1–k)-th zone where the specific point is located and those of the (2–k)-th zone where the specific point is located.

For example, when weighted value of the first weather phenomenon is a, weighted value of the second weather phenomenon is b, the value of the predicted weather condition of the specific point P in the (1–k)-th zone is $W_{1-k}$, the value of the predicted weather condition of the specific point P in the (2–k)-th zone is $W_{2-k}$, and the result value of predicting the weather condition of the specific point P is $W_P$, the interpolation may be applied by using the following equation:

$$W_P = \frac{aW_{1-k} + bW_{2-k}}{a+b}$$

If the first weather phenomenon is related to a change in atmospheric pressure, and the second weather phenomenon is related to fine dust, weighted value of the change in atmospheric pressure and weighted value of the fine dust may be determined to be 2 and 1, respectively, by referring to impact over at least one piece of geographical distribution information and temporal change information of the observation data during the time from a particular previous time to the current time. In this case, $W_P$, the result value of predicting the weather condition of the specific point P may be expressed as follows:

$$W_P = \frac{2W_{1-k} + 1W_{2-k}}{2+1}$$

As another example, if a boundary of the (1−k)-th zone where the specific point P is located is not identical to a boundary of the (2−k)-th zone where the specific point P is located, and if the first weather phenomenon and the second weather phenomenon affect each other, weighted values of the first weather phenomenon and the second weather phenomenon may be determined by referring to a distance between the specific point P and the boundary of the (1−k)-th zone and a distance between the specific point P and the boundary of the (2−k)-th zone.

For example, considering that a minimum distance value between the specific point P and the boundary of the (1−k)-th zone is a, and a minimum distance value between the specific point P and the boundary of the (2−k)-th zone is b, the values may be applied to the aforementioned equation but it is not limited to this.

In accordance with the present disclosure, a weather condition may be predicted by subdividing time and a place.

Besides, it is possible to predict a user's travel path and transmit to the user the predicted weather condition of the specific point on the travel path.

In addition, it is possible to suggest means of transportation or rescheduling by section on the travel path depending on the predicted weather condition to the user.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs.

Program commands include not only a machine language code made by a complier but also a high-level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. While the disclosure has been shown and described with respect to the preferred embodiments, it, however, will be understood by those skilled in the art that various changes and modification may be made without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for predicting a weather-related situation at a specific point on a user's travel path by referring to individual pieces of observation data measured from multiple observation points, comprising steps of:
   (a) a weather-related situation predicting server obtaining the individual pieces of the observation data measured from the observation points;
   (b) the weather-related situation predicting server (i) preparing and managing the observation data as a map by referring to locations of the observation points and (ii) analyzing at least one piece of geographical distribution information of the observation data obtained from the observation points located near the specific point or temporal change information thereof by referring to a machine learning database that is created by learning previous reference data measured at the observation points, thereby predicting a weather condition of the specific point at a future time coming after a certain period of time from a current time; and
   (c) the weather-related situation predicting server predicting a location of the specific point on the user's travel path over time by referring to the user's schedule data and transmitting information on the predicted weather condition of the specific point to the user before the certain period of time from the future time corresponding to the specific point,
   wherein the schedule data refers to at least one piece of the user's present location information, schedule information stored in a calendar, communication information obtained from communication history, and activity information obtained from a previous activity pattern by day of week or by location
   wherein the specific point includes information on a section on the travel path, wherein the machine learning database corresponds to the previous reference data and further includes travel data that is learned from multiple subjects, wherein the travel data include means of travel and travel time used by the section by each of the subjects; and
   wherein, at the step of (c), the weather-related situation predicting server suggests (i) the means of travel by the section of the travel path or (ii) rescheduling depending on the predicted weather condition by referring to the machine learning database and the user's predicted travel path.

2. The method of claim 1, wherein at least some of the multiple observation points include moving-type observation points as user terminals, where one or more sensors and applications are installed, and installation-type observation points installable on geographic features.

3. A method for predicting a weather-related situation at a specific point on a user's travel path by referring to individual pieces of observation data measured from multiple observation points, comprising steps of:
   (a) a weather-related situation predicting server obtaining the individual pieces of the observation data measured from the observation points;
   (b) the weather-related situation predicting server (i) preparing and managing the observation data as a map by referring to locations of the observation points and (ii) analyzing at least one piece of geographical distribution information of the observation data obtained from the observation points located near the specific point or temporal change information thereof by referring to a machine learning database that is created by learning previous reference data measured at the observation points, thereby predicting a weather condition of the specific point at a future time coming after a certain period of time from a current time, wherein the multiple observation points are managed by referring to information on (1−k−1)-st to (1−k−nk)-th observation points located in a (1−k)-th zone whose boundary is divided into by characteristics of factors affecting a first weather phenomenon where k is an integer that is one of numbers from 1 to m; and wherein the weather-related situation predicting server predicts the weather condition of the specific point at the future time coming after the certain period of time from the current time by analyzing at least one piece of geographical distribution information of the observation data obtained from observation points belonging to a particular section in which the specific point is located and temporal change information thereof by referring to machine learning database.

4. The method of claim 3, wherein, upon comparting each zone, a prefixed area is separated with virtual grid comprised of cells of fixed size and wherein specified cells, among the cells, whose degrees of affecting the first weather phenomenon exceed a preset threshold, are set as one clustered zone.

5. The method of claim 3, wherein the multiple observation points are overlappingly managed by referring to information on (2-k-1)-st to (2-k-nk)-th observation points located in a (2-k)-th zone whose boundary is divided into by characteristics of factors affecting a second weather phenomenon where k is an integer that is one of numbers from 1 to m.

6. The method of claim 5, wherein, upon predicting the weather condition of the specific point, if a boundary of the (1-k)-th zone where the specific point is located is not matched with a boundary of the (2-k)-th zone where the specific point is located, the weather condition of the specific point is predicted by using a compartment depending on either the first weather phenomenon and the second weather phenomenon, as a special weather phenomenon, that gives greater impact over at least one piece of the geographical distribution information of the observation data and the temporal change information thereof from a particular previous time to the current time.

7. The method of claim 5, wherein, upon predicting the weather condition of the specific point, if a boundary of the (1-k)-th zone where the specific point is located is not matched with a boundary of the (2-k)-th zone where the specific point is located, the weather condition of the specific point is predicted (i) by determining weighted values of the first weather phenomenon and the second weather phenomenon by referring to impact over at least one piece of the geographical distribution information of the observation data and the temporal change information thereof from a particular previous time to the current time if the first weather phenomenon and the second weather phenomenon have characteristics of affecting each other and (ii) by applying interpolation with the weighted values of the first weather phenomenon and the second weather phenomenon to predicted values of the weather condition of the (1-k)-th zone where the specific point is located and those of the (2-k)-th zone where the specific point is located.

8. The method of claim 5, wherein, upon predicting the weather condition of the specific point, if a boundary of the (1-k)-th zone where the specific point is located is not matched with a boundary of the (2-k)-th zone where the specific point is located, the weather condition of the specific point is predicted (i) by determining weighted values of the first weather phenomenon and the second weather phenomenon by referring to distance between the specific point and the boundary of the (1-k)-th zone and distance between the specific point and the boundary of the (2-k)-th zone and (ii) by applying interpolation with the weighted values of the first weather phenomenon and the second weather phenomenon to predicted values of the weather condition of the (1-k)-th zone where the specific point is located and those of the (2-k)-th zone where the specific point is located.

9. A server for predicting a weather-related situation at a specific point on a user's travel path by referring to individual pieces of observation data measured from multiple observation points, comprising:
a communication unit for obtaining the individual pieces of the observation data measured from the observation points; and
a processor for (i) preparing and managing the obtained observation data as a map by referring to locations of the observation points and (ii) analyzing at least one piece of geographical distribution information of the observation data obtained from the observation points located near the specific point or temporal change information thereof by referring to machine learning database that is created by learning previous reference data measured at the observation points, thereby predicting a weather condition of the specific point at a future time coming after a certain period of time from a current time,
wherein the processor predicts a location of the specific point on the user's travel path over time by referring to the user's schedule data and transmits information on the predicted weather condition of the specific point to the user through the communication unit before the certain period of time from the future time corresponding to the specific point,
wherein the schedule data refers to at least one piece of the user's present location information, schedule information stored in a calendar, communication information obtained from communication history, and activity information obtained from a previous activity pattern by day of week or by location,
wherein the specific point includes information on a section on the travel path, wherein the machine learning database corresponds to the previous reference data and further includes travel data that is learned from multiple subjects, wherein the travel data include means of travel and travel time used by the section by each of the subjects, and
wherein the processor suggests (i) the means of travel by the section of the travel path or (ii) rescheduling depending on the predicted weather condition through the communication unit by referring to the machine learning database and the user's predicted travel path.

10. The server of claim 9, wherein at least some of the multiple observation points include moving-type observation points as user terminals, where one or more sensors and applications are installed, and installation-type observation points installable on geographic features.

11. A server for predicting a weather-related situation at a specific point on a user's travel path by referring to individual pieces of observation data measured from multiple observation points, comprising:
a communication unit for obtaining the individual pieces of the observation data measured from the observation points; and
a processor for (i) preparing and managing the obtained observation data as a map by referring to locations of the observation points and (ii) analyzing at least one piece of geographical distribution information of the observation data obtained from the observation points located near the specific point or temporal change information thereof by referring to machine learning database that is created by learning previous reference data measured at the observation points, thereby predicting a weather condition of the specific point at a future time coming after a certain period of time from a current time, wherein the multiple observation points are managed by referring to information on (1–k–1)-st to (1–k–nk)-th observation points located in a (1–k)-th zone whose boundary is divided into by characteristics of factors affecting a first weather phenomenon where k is an integer that is one of numbers from 1 to m; and wherein the processor predicts the weather condition of the specific point at a future time coming after a certain period of time from a current time through the communication unit by analyzing at least one piece of geographical distribution information of the observation data obtained from observation points belonging to a particular section in which the specific point is located and temporal change information thereof by referring to machine learning database.

12. The server of claim 11, wherein, upon comparting each zone, a prefixed area is separated with virtual grid comprised of cells of fixed size and wherein specified cells, among the cells, whose degrees of affecting the first weather phenomenon exceed a preset threshold, are set as one clustered zone.

13. The server of claim 11, wherein the multiple observation points are overlappingly managed by referring to information on (2–k–1)-st to (2–k–nk)-th observation points located in a (2–k)-th zone whose boundary is divided into by characteristics of factors affecting a second weather phenomenon where k is an integer that is one of numbers from 1 to m.

14. The server of claim 13, wherein upon predicting the weather condition of the specific point, if a boundary of the (1–k)-th zone where the specific point is located is not matched with a boundary of the (2–k)-th zone where the specific point is located, the processor predicts the weather condition of the specific point by using a compartment depending on either the first weather phenomenon and the second weather phenomenon, as a special weather phenomenon, that gives greater impact over at least one piece of the geographical distribution information of the observation data and the temporal change information thereof from a particular previous time to the current time.

15. The server of claim 13, wherein, upon predicting the weather condition of the specific point, if a boundary of the (1–k)-th zone where the specific point is located is not matched with a boundary of the (2–k)-th zone where the specific point is located, the processor predicts the weather condition of the specific point (i) by determining weighted values of the first weather phenomenon and the second weather phenomenon by referring to impact over at least one piece of the geographical distribution information of the observation data and the temporal change information thereof from a particular previous time to the current time if the first weather phenomenon and the second weather phenomenon have characteristics of affecting each other and (ii) by applying interpolation with the weighted values of the first weather phenomenon and the second weather phenomenon to predicted values of the weather condition of the (1–k)-th zone where the specific point is located and those of the (2–k)-th zone where the specific point is located.

16. The server of claim 13, wherein, upon predicting the weather condition of the specific point, if a boundary of the (1–k)-th zone where the specific point is located is not matched with a boundary of the (2–k)-th zone where the specific point is located, the processor predicts the weather condition of the specific point (i) by determining weighted values of the first weather phenomenon and the second weather phenomenon by referring to distance between the specific point and the boundary of the (1–k)-th zone and distance between the specific point and the boundary of the (2–k)-th zone and (ii) by applying interpolation with the weighted values of the first weather phenomenon and the second weather phenomenon to predicted values of the weather condition of the (1–k)-th zone where the specific point is located and those of the (2–k)-th zone where the specific point is located.

* * * * *